Dec. 11, 1962  C. P. HANKUS  3,067,797
FOIL SLITTING MECHANISM
Filed Nov. 12, 1958

Inventor.
Chester P. Hankus
By
Kenneth T. Snow
Atty.

United States Patent Office 3,067,797
Patented Dec. 11, 1962

3,067,797
FOIL SLITTING MECHANISM
Chester P. Hankus, Chicago, Ill., assignor, by mesne assignments, of sixty-five percent to Chester P. Hankus, ten percent to Theodore Hankus, ten percent to Peter Van Beek, and fifteen percent to Kenneth T. Snow
Filed Nov. 12, 1958, Ser. No. 773,277
15 Claims. (Cl. 153—2)

This invention relates to a foil slitting mechanism and is a continuation in part of my pending application entitled Artificial Tree, having Serial No. 627,832, and filed December 12, 1956, now Patent No. 2,889,650.

Christmas decorations involve the use of metal foil in various forms. My parent case shows the use of slitted foil in the making of artificial trees. It is therefore a principal object of the present invention to provide a mechanism which will effect a slitting of strips of metal foil inwardly from one side thereof to produce a plurality of transversely disposed foil fingers.

An important object of this invention is to provide a cutting device for decorative strip foil material in which fingers are cut laterally inwardly from one side of said strip foil material.

Another important object of this invention is to provide mechanism for slitting strips of metal foil inwardly from one side thereof to a position short of the other side and simultaneously imparting a twist or a spiraling to the individually formed fingers about their own longitudinal axes.

Another and further important object is to cut metal foil fingers in a strip material with a reverse angle shear thereby forming or bending the fingers down away from the strip material prior to actual cutting to thereby effect a spiraling of the fingers.

Still another important object of this invention is to equip a foil cutter having a stationary shear member with a kissing face having an inclined beveled edge and having an oscillating knife member with a kissing face having an inclined beveled edge cooperating therewith whereupon the feeding of a strip of foil between the stationary shear member and the oscillating knife causes the foil to have fingers cut therein and wherein the beveled edge on the stationary shear member causes the finger to be bent preliminary to actual cutting by the reciprocating knife.

Still another and further important object of this invention is the provision of means in a foil slitting machine for effecting a preliminary bending of a portion of the foil and subsequently cutting the strip of foil inwardly from one edge thereof to a position just short of the opposite edge whereby the cut finger is bent or turned around its own longitudinal axis relative to the uncut edge portion of the foil strip.

A still further important object of this invention is to provide cut foil fingers with a pre-bent, longitudinally disposed stress line to give the fingers a V-shape in cross section and thereby substantially enhance the overall rigidity of the fingers.

Other and further important objects and advantages will become apparent from the following specification and accompanying drawings.

Figure 1:
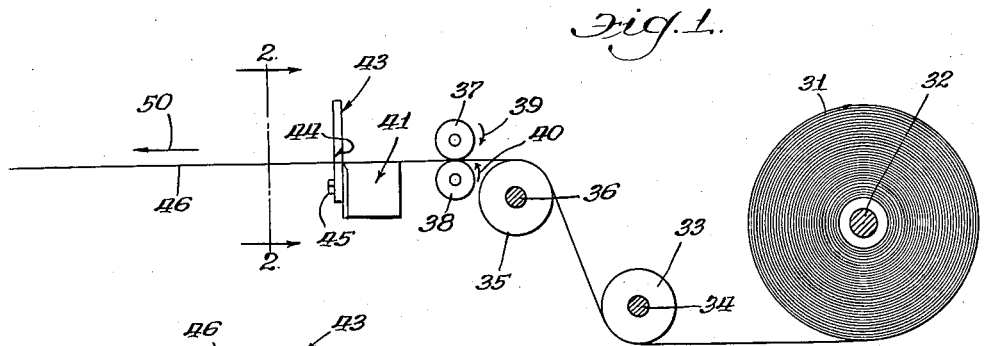
FIGURE 1 is a side elevational view in diagrammatic form of one form of foil slitting mechanism.
Figure 2:
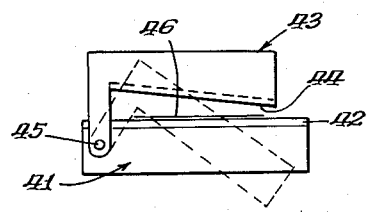
FIGURE 2 is an end elevational view of the foil slitting mechanism of FIGURE 1.
Figure 3:
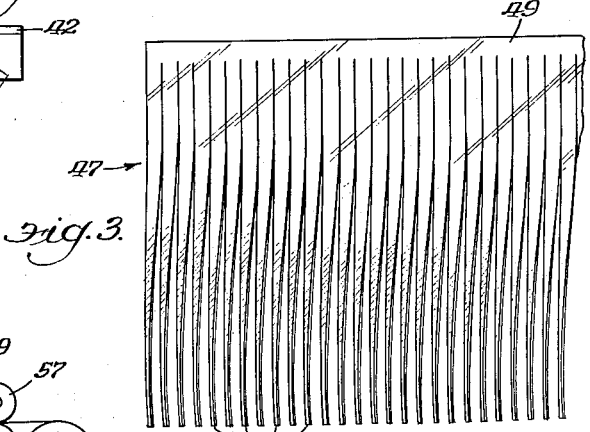
FIGURE 3 is a plan view of a piece of the strip foil slit by either of the mechanisms of this invention.

The reference numeral 31 indicates generally a roll supply of strip metal foil which is mounted on a supporting shaft 32. Further, as best shown in FIGURE 1, a guide roller 33 lies parallel to and spaced from the roll or reel supply 31 and is journally mounted on a supporting shaft 34. A second parallel guide roller 35 is carried on a journalling shaft 36 in spaced relation from the guide roller 33. Vertically arranged cooperative foil feeding rolls 37 and 38 are driven in the direction of the arrows 39 and 40 respectively so that foil fed therebetween will be moved away from the roll supply 31. A stationary shear table 41 is provided with an undercut lip 42 acting as a kissing face. A reciprocal or oscillating shear knife 43 having substantial thickness cooperates with the stationary shear 41 for the cutting of the fingers in the foil strip. The oscillatable shear has a kissing face or cutting edge 44 inclined from a high point adjacent the kissing face 42 of the stationary shear table 41 to a low point spaced from the face 42 in a direction of the movement of the foil. The kissing face 44 provides for simultaneous spiraling of each individual foil finger about its own longitudinal axis as it is cut by the shear members 41—43. This spiraling in each foil finger is caused by a bending to stress the uncut foil along a line defined by the edge of the lip 42, and by subsequently cutting along substantially that stressed line. It is further importantly necessary that the cutting occur along the stressed line from one edge of the foil strip inwardly to a point short of the opposite edge thereof. In the instant embodiment as shown in FIGURE 2, the oscillating shear member 43 is hinged at 45 on the stationary table 41 and thus effects oscillation by rocking thereabout. When the shear 43 rocks on its hinge 45 a foil strip 46 from the roll supply 31 is cut to produce a fingered foil as shown in FIGURE 3. It should be noted that other oscillating shear member or knife arrangements which will provide for cutting of the foil from one edge of the foil strip inwardly to a point short of the opposite edge thereof may be used. In other words, the foil strip 46 is unwound from the roll 31 and guided around the guide rollers 33 and 35 and thence into and through the cooperative feeding rolls 37 and 38. As these feeding rolls are driven in increments in the direction of the arrows 39 and 40 the foil is fed across the stationary shear table 41 and has slits cut inwardly from the one side of the strip to a position just short of the other side of the strip of foil. The fingers 48 of the fingered foil have their width controlled by the incremental speed of the cooperative feed rolls 37 and 38 in combination with the speed of oscillation of the cutting shear 43. Thus the foil strip is cut through one side and continues through the strip except for a narrow retaining edge on the opposite side of the strip as shown at 49. This edge 49 is continuous and uncut and holds the foil material together as a unit as shown in FIGURE 3. To achieve the spiraling of the individual fingers the oscillation of the cutting shear or knife 43 must be related to the incremental speed of the moving foil to produce cutting along substantially the stressed line.

It is the inclination of the kissing face 44 on the cutting edge of the reciprocal shear that causes the foil fingers 48 to spiral or curl from the outer cut edge of the strip 46 inwardly to the uncut edge 49 of the strip 46 about their own longitudinal axes. The reverse angle 44 causes the outer edge of the foil strip 46 to be bent downwardly away from the shearing edge of the cutter prior to the time any cut in the foil is made. This means that the foil is bent or curled downwardly away from the plane of the body of the foil strip just in advance of the cutting of the fingers 48. The spiraling or curling of the fingers is enhanced by the undercut lip kissing face 42 on the stationary shear 41 as it cooperates with the beveled cut of the oscillating shear to move the sides of the formed fingers in the direction of movement of the foil down under the stationary shear. The reason for the greater spiraling or downward bending of the outer cut edge of the strip 46 is that the kissing face 44 is a rocking shear and the outer edge is bent and cut prior to the cutting of the fingers inwardly to the uncut edge 49 of the foil strip. Thus the fingers 48 are bent or folded over at their outer ends whereas at their inner ends adjacent the uncut edge 49 there is a minimum bend and the formed fingers blend into the uncut edge at a substantially flat or straight angle therewith. The rocking, bending, and cutting tool 43 with its kissing face 44 is clearly shown in FIGURE 2 and cooperates with the stationary shear table 41 with its undercut lip kissing face 42. The particularly beveled kissing faces 42 and 44 create stresses in and along the foil fingers to cause them to spiral or curl as described. The foil 46 and the fingered foil 47, that is, after it has been slit transversely by the oscillatable shear 43, moves in the direction of the arrow 50 for subsequent use in the application as a branch covering for a Christmas tree such as shown in my parent application.

Figure 4:
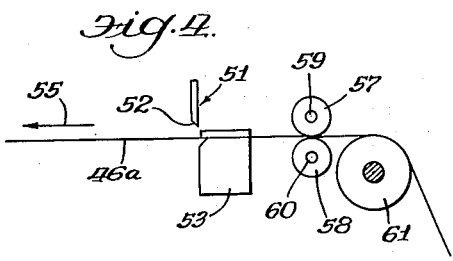
FIGURE 4 is a side elevational view in diagrammatic form of a modified form of foil cutting mechanism and is comparable to the diagrammatic view of FIGURE 1.
Figure 6:
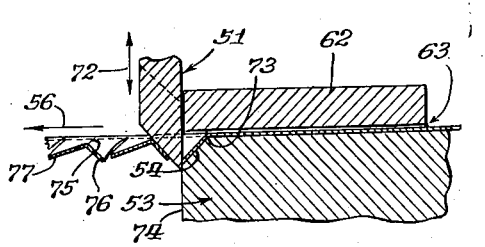
FIGURE 6 is a sectional view taken on the line 6—6 of FIGURE 5.
Figure 5:
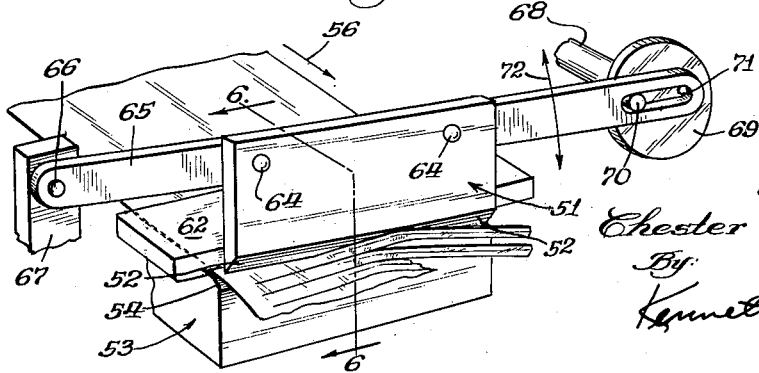
FIGURE 5 is a perspective view of the foil slitting machine as shown in the diagrammatic view of FIGURE 4.

A modified cutting mechanism is shown in FIGURES 4, 5 and 6. In this device a more or less standard oscillating knife is employed as shown at 51 wherein the blade has a beveled edge or kissing face 52 inclined upwardly and forwardly in the direction of movement of the strip foil 46a being slitted. However, the stationary shear member 53 has a kissing face 54 inclined downwardly and forwardly in the direction of movement of the strip foil 46a to cause a downward bending of the foil finger about its own longitudinal axis prior to actual slitting of the foil in the formation of the fingers.

The arrow 55 in FIGURE 4 indicates the direction of movement of the strip of foil 46a. Similarly the arrow 56 in FIGURES 5 and 6 shows this same direction of foil movement. The foil strip is fed by increments at any desired speed by cooperative feed rolls 57 and 58 which are mounted on shafts 59 and 60 respectively. A guide roller 61 is shown guiding the strip foil into the feeding rolls 57 and 58 whereupon the foil is delivered to a position over the stationary shear member 53. A guide plate 62 is disposed over and spaced slightly above the stationary shear member 53 and provides a confined path 63 for the foil from the feed rolls to the oscillating knife 51. The path 63 is defined as the space between the shear member 53 and the guide plate 62. This construction is clearly shown in FIGURES 4, 5 and 6.

As best shown in FIGURE 5, the knife 51 which has substantial thickness is riveted at 64 to an arm 65 which in turn is pivotally mounted at 66 on a fixed support 67. The other end of the arm 65 is arranged and constructed for vertical reciprocal movement by a crank mechanism. A drive shaft 68 has a disc 69 mounted on the end thereof which in turn has a crank element 70 thereon. An elongated slot 71 in the end of the arm 65 permits oscillation of the arm by the crank 70. The two directional arrow 72 shown in FIGURES 5 and 6 shows the direction of oscillation of the arm 65 and thus the knife 51 about the hinge 66.

Figure 7:
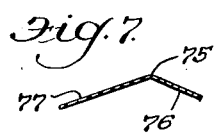
FIGURE 7 is an enlarged detail sectional view taken through one of the cut fingers and showing the pre-bent stress line formed therein.

The extent of the beveled kissing face 54 from line 73 where the inclination commences to the front face 74 of the stationary shear is slightly less than the width of the foil finger being cut. This causes the foil fingers bent by the downward movement of the oscillating knife 51 to have a bend line 75 formed longitudinally of the fingers. The cutting of the foil fingers by these particular cooperative kissing faces results in the creation of a stressed foil finger wherein the finger tends to spiral about its own longitudinal axis. The kissing face 54 forms one side of a V-shape for the foil fingers while the degree of bend of the other side of the foil fingers is determined by the angle of inclination of the kissing face 52. The cross-sectional shape of the foil finger formed by the cooperative kissing faces 54 and 52 is a V with one leg 76 thereof shorter than the other leg 77 as shown in FIGURES 6 and 7. With the foil fingers creased in a somewhat V-shape in cross section, they are substantially more rigid and tend to hold their formed shape despite greater abuse. Thus when the foil fingers are used in artificial tree construction they stand up over long periods of time with the same quality decorative effect.

In operation the strip of metal foil 46a is fed by the cooperative feed rolls toward and into the confined path 63 over the stationary shear plate and under the guide plate 62. The knife 51 having its angled kissing face 52 oscillatably moving in a rocking motion causes the foil to be cut or slit inwardly from one side thereof to a point just short of the opposite side. The cut foil of FIGURE 3 shall be considered to be representative of the foil cut and formed by the cutter of FIGURES 1 and 4. More specifically the shape of the foil fingers cut by the cutter of FIGURES 4 and 5 are shown in FIGURES 6 and 7. The strip or edge of uncut foil is shown at 49 in FIGURE 3. In the device of FIGURES 1 and 2 the foil fingers were preliminarily bent by reason of the particularly beveled kissing face on the oscillating knife. In the form of the invention as shown in FIGURES 4, 5 and 6, the particularly bevelled kissing face 54 on the stationary shear 53 cooperates with the knife 51 to similarly cause a downward bending of the foil finger prior to actual cutting or slitting. The knife pushes downwardly on the foil extending down over the edge of the stationary shear and because of the receding bevelled kissing face 54 on the stationary member 53 the foil is not cut or slit until the knife cooperates with the front flat face 74 of the stationary shear. The pre-bending of the foil fingers on the receding bevel 54 is clearly shown in FIGURE 6. This initial bending prior to cutting of the fingers gives the fingers a spiral or curling effect about the longitudinal axis through each finger. Further, the cutting of the individual fingers creates a stressed condition which increases the tendency of the foil fingers to curl or spiral about their own longitudinal axes. The bend line 75 tends to make the fingers considerably more rigid. These features of course combine to make a desirable decorative and useful effect for the foil and enhance its use in various ways. The embodiment of the invention shown in FIGURES 4, 5 and 6 will also produce a spiral foil finger comparable to the aforedescribed foil fingers of the first embodiment by reducing the feed of the foil strip so that the knife 51 slits each foil finger along substantially the stress line 75. The extent of spiralling of the foil fingers of the first embodiment and of the second embodiment when the fingers of the second embodiment are slit along substantially the stress line 75 is varied by the relative hardness of the particular metal strip foil used, the angles of the kissing faces 44 and 54, the angles of the knives 43 and 51 to the stationary shear members 51 and 53, and the width of the individual foil fingers. Generally, the use of softer foil strip material will produce greater spiralling. As the angles of the kissing faces 44 and 54 are increased to cause a greater bending or stressing prior to slitting along substantially the stress line, the greater the extent of spiralling. Generally, as the angles of the knives 43 and 51 to the stationary shear members 41 and 43 are reduced, the extent of spiralling is increased. If the horizontal width of the kissing faces 44 and 54 are reduced with a corresponding reduction in the incremental fede of the foil strip so that cutting occurs along substantially the stress line of the foil the extent of spiralling will be increased.

There has been provided herein two mechanisms for cutting foil fingers with a pre-bending to accomplish a spiral turning or twisting of the fingers about their own longitudinal axes. I am aware that numerous details of construction may be varied throughout a wide range without departing from the principles disclosed herein and I therefore do not propose limiting the patent granted hereon otherwise than as necessitated by the appended claims.

What is claimed is:

1. A foil slitter comprising a shear plate, a source of supply of strip foil, means moving a strip of foil in increments over said shear plate, a knife having a straight cutting edge, means mounting said knife relative to said shear plate so that said knife oscillates toward and away from said shear plate to effect a slitting of said strip of foil inwardly from one edge thereof to a point short of the opposite edge thereof to form substantially parallel fingers with the cutting edge of said knife engaging said foil at increasing angles in cutting said foil, and means on said shear plate and said knife to bend said parallel fingers into a V-shaped cross section.

2. A foil finger cutting device including a stationary edge over which a foil strip is passed in a certain direction, an oscillating shear having a straight cutting edge, means mounting the cutting edge of said oscillating shear for pivotal movement past said stationary edge at an increasing angle of said cutting edge to said foil, said stationary edge and said cutting edge of said oscillating shear having cooperating kissing faces, said kissing face of the cutting edge having an inclined angular surface extending from a high position adjacent the kissing face of said stationary edge to a downward and lower position away from said kissing face of the stationary edge in the direction of the certain direction of movement of the foil strip.

3. A foil finger cutting device including a stationary edge over which a foil strip is passed in a certain direction, an oscillating shear having a straight cutting edge, means pivotally carrying the cutting edge of said oscillating shear for pivotal movement about an axis spaced from one end of said cutting edge and relative to said stationary edge so that the other end of said cutting edge engages said stationary edge before said one end and so that said cutting edge passes said stationary edge at increasing angles as said cutting edge is pivoted toward said stationary edge, said stationary edge and said cutting edge having cooperating kissing faces, said kissing face of the cutting edge having an inclined angular surface extending from a high position adjacent the kissing face of said stationary edge to a downward and lower position away from said kissing face of the stationary edge in the direction of the certain direction of movement of the foil strip, said means further positioning said cutting edge at an initial cutting angle so that the formed fingers are stressed to cause a general spiralling of the formed fingers about the longitudinal direction of the fingers as a general axis contemporaneously with the cutting thereof.

4. A foil finger cutting device including a stationary plate over which a foil strip is passed in a certain direction, an oscillating shear having a straight cutting edge, means pivotally carrying the cutting edge of said oscillating shear for pivotal movement about an axis spaced from one end of said cutting edge and relative to said stationary plate so that the other end of said cutting edge engages said stationary plate before said one end and so that said cutting edge passes said stationary plate at increasing angles as said cutting edge is pivoted toward said stationary plate, said stationary plate and said cutting edge having cooperating kissing faces, said kissing face of said stationary plate being inclined downwardly and forwardly in the direction of movement of said certain direction of said foil strip with the high side of said inclined kissing face located at a spaced distance from the kissing face of said cutting edge and the low side thereof abutting the kissing face of the cutting edge, and said means further positioning said cutting edge at an initial cutting angle so that the formed foil fingers are stressed to cause a general spiralling of the formed foil fingers about the longitudinal direction of the fingers as a general axis contemporaneously with the cutting thereof.

5. A foil finger cutting device including a stationary plate over which a foil strip is passed in a certain direction, an oscillating shear having a straight cutting edge, means pivotally carrying the cutting edge of said oscillating shear for pivotal movement about an axis spaced from one end of said cutting edge and relative to said stationary plate so that the other end of said cutting edge engages said stationary plate before said one end and so that said cutting edge passes said stationary plate at increasing angles as said cutting edge is pivoted toward said stationary plate, said stationary plate and said cutting edge having cooperating kissing faces, said kissing face of said stationary plate being inclined downwardly and forwardly in the direction of movement of said certain direction of said foil strip with the high side of said inclined kissing face located at a spaced distance from the kissing face of said cutting edge and the low side thereof abutting the kissing face of the cutting edge, and said cutting edge kissing face being inclined from a low position adjacent the kissing face of the stationary plate to a high position spaced from the kissing face of the stationary plate in the direction of the certain direction of the foil strip, whereby the formed foil fingers are bent into a general V-shape in cross section.

6. A foil finger cutting device including a stationary plate over which a foil strip is passed in increments in a certain direction, an oscillating shear having a straight cutting edge of substantial thickness, means pivotally carrying the cutting edge of said oscillating shear for pivotal movement about an axis spaced from one end of said cutting edge and relative to said stationary plate so that the other end of said cutting edge engages said stationary plate before said one end and so that said cutting edge passes said stationary plate at increasing angles as said cutting edge is pivoted toward said stationary plate, said stationary plate and said cutting edge having cooperating kissing faces, said kissing face of said stationary plate being inclined downwardly and forwardly in the direction of movement of said certain direction of said foil strip with the high side of said inclined kissing face located at a spaced distance from the kissing face of said cutting edge and the low side thereof abutting the kissing face of the cutting edge, and said cutting edge kissing face being inclined from a low position adjacent the kissing face of the stationary plate to a high position spaced from the kissing face of the stationary plate in the direction of the certain direction of the foil strip, whereby the formed foil fingers are bent into a general V-shape in cross section with the degree and shape of the V depending on the amount of increment feed and angles of inclination of the cutting edge and the inclined kissing face of the stationary plate.

7. A foil finger cutting device including a stationary plate over which a foil strip is passed in a certain direction, an oscillating shear having a straight cutting edge, means pivotally carrying the cutting edge of said oscillating shear for pivotal movement about an axis spaced from one end of said cutting edge and relative to said stationary plate so that the other end of said cutting edge engages said stationary plate before said one end and so that said cutting edge passes said stationary plate at increasing angles as said cutting edge is pivoted toward said stationary plate, said stationary plate and said cutting edge having cooperating kissing faces, said kissing face of said stationary plate being inclined downwardly and forwardly in the direction of movement of said certain direction of said foil strip with the high side of said inclined kissing face located at a spaced distance from the kissing face of said cutting edge and the low side thereof abutting the kissing face of the cutting edge, and said cutting edge kissing face being inclined from a low position adjacent the kissing face of the stationary plate to a high position spaced from the kissing face of the stationary plate in the direction of the certain direction of the foil strip, whereby the formed foil fingers are bent into a general V-shape in cross section, and said means further positioning said cutting edge at an initial cutting angle so that the formed foil V-shaped fingers are stressed to cause a general spiralling of the fingers about their general longitudinal axes contemporaneously with the cutting thereof.

8. A foil finger cutting device including a stationary plate over which a foil strip is passed in a certain direction, an oscillating shear having a straight cutting edge, means pivotally carrying the cutting edge of said oscillating shear for pivotal movement about an axis spaced from one end of said cutting edge and relative to said stationary plate so that the other end of said cutting edge engages said stationary plate before said one end and so that said cutting edge passes said stationary plate at increasing angles as said cutting edge is pivoted toward said stationary plate, said stationary plate and said cutting edge having cooperating kissing faces, said kissing face of said stationary plate being inclined downwardly and forwardly in the direction of movement of said certain direction of said foil strip with the high side of said inclined kissing face located at a spaced distance from the kissing face of said cutting edge and the low side thereof abutting the kissing face of the cutting edge, said cutting edge bending the foil finger about the downwardly and forwardly inclined kissing face of the stationary plate, and said foil finger being of greater width than the longitudinal extent of the inclined kissing surface of the stationary plate, whereby a V bend is formed in said foil finger.

9. In a cutting device for certain metal foils used in the manufacture of artificial tree branch construction, a stationary shear, an oscillating shear comprising a straight cutting edge, means mounting and positioning said oscillating shear relative to said stationary shear so that the cutting edge of said oscillating shear engages said stationary shear at increasing angles as said oscillating shear is moved toward said stationary shear, means being formed so that when said certain metal foil is positioned between said shears, a permanent twist is imparted to said foil about an axis parallel to the cutting line of said foil contemporaneously with the cutting thereof.

10. In a cutting device for certain metal foils used in the manufacture of artificial tree branch constructions, a stationary shear, an oscillating shear comprising a straight cutting edge, means pivotally carrying the cutting edge of said oscillating shear for pivotal movement of said cutting edge about an axis spaced from one end thereof and relative to said stationary shear so that said cutting edge engages said stationary shear at increasing angles as said oscillating shear is moved toward said stationary shear, said means carrying said cutting edge at an initial cutting angle to said stationary shear so that when said certain foil is positioned between said shears a permanent twist is imparted to said foil about an axis parallel to the cutting line of said foil contemporaneously with the cutting thereof.

11. In a cutting device for certain metal foils used in the manufacture of artificial tree branch constructions, a stationary shear, an oscillating shear comprising a straight cutting edge, means pivotally carrying the cutting edge of said oscillating shear in foil cutting cooperation with said stationary shear, the pivotal axis of said cutting edge being positioned in a spaced relationship from the plane of said stationary shear so that the end of said cutting edge furthest from said pivotal axis engages said stationary shear before the nearest end with the angle of the cutting edge to the stationary shear increasing from said furthest end to said nearest end as said oscillating shear is moved toward said stationary shear, the pivotal axis of said cutting edge being further positioned relative to the length of said cutting edge so that the initial cutting angle of said cutting edge is one whereby a permanent twist is imparted to said foil about an axis parallel to the cutting line of said foil contemporaneously with the cutting thereof.

12. In a process for cutting certain metal foils for the manufacture of artificial tree branch construction, the steps of supporting a certain foil strip on a stationary shear with one end projecting therebeyond a certain distance, applying a straight cutting edge at a certain angle to the plane of said foil to one edge of said foil at the intersection thereof with the edge of said stationary shear, moving said cutting edge through said foil at a substantially increasing angle to the plane of said foil from said one edge to a point short of the opposite edge thereof, removing said cutting edge from engagement with said foil, moving said foil strip further beyond said edge of said stationary shear, and repeating the aforementioned steps, said certain angle and said substantially increasing angle being selected as ones which contemporaneously with the cutting of the foil will impart a permanent twist to said foil about a line parallel to the line of cutting of said foil.

13. A foil slitter comprising a shear plate, means moving a strip of foil over said shear plate, a knife, means mounting said knife relative to said shear plate to oscillate said knife toward and away from said shear plate to effect repeated slitting of said strip of foil inwardly from one edge thereof to a point short of the opposite edge thereof to form substantially parallel foil fingers, and means responsive to the oscillation of said knife for stressing said foil along a line transversely of said strip of foil prior to slitting of said foil along substantially said stressed line, whereby each foil finger is caused to spiral.

14. A foil slitter comprising a shear plate, means moving a strip of foil over said shear plate, a knife, means mounting said knife relative to said shear plate to oscillate said knife toward and away from said shear plate to effect repeated slitting of said strip of foil inwardly from one edge thereof to form substantially parallel foil fingers, and means on said knife operating responsive to the oscillation of said knife for stressing said foil along a line transversely of said strip of foil prior to slitting of said foil along substantially said stressed line, whereby each foil finger is caused to spiral.

15. A foil slitter comprising a shear plate, means moving a strip of foil over said shear plate, a knife, means mounting said knife relative to said shear plate to oscillate said knife toward and away from said shear plate to effect repeated slitting of said strip of foil inwardly from one edge thereof to a point short of the opposite edge thereof to form substantially parallel foil fingers, and means on said shear plate operating responsive to the oscillation of said knife for stressing said foil along a line transversely of said strip of foil prior to slitting of said foil along substantially said stressed line, whereby each foil finger is caused to spiral.

References Cited in the file of this patent

UNITED STATES PATENTS

| | | |
|---|---|---|
| 735,936 | Blakey | Aug. 11, 1903 |
| 939,468 | Boyce | Nov. 9, 1909 |
| 1,805,399 | Hendrick | May 12, 1931 |
| 1,954,332 | Seitz | Apr. 10, 1934 |
| 2,264,520 | Gleason | Dec. 2, 1941 |
| 2,573,767 | Jensen et al. | Nov. 6, 1951 |
| 2,789,642 | Schwork | Apr. 23, 1957 |

FOREIGN PATENTS

| | | |
|---|---|---|
| 218,813 | Great Britain | July 17, 1924 |